United States Patent
Bergamo

[19]

[11] Patent Number: 6,104,708

[45] Date of Patent: Aug. 15, 2000

[54] WIRELESS DATA COMMUNICATIONS SYSTEM

[75] Inventor: Marcos Antonio Bergamo, Wellesley, Mass.

[73] Assignee: BBN Corporation, Burlington, Mass.

[21] Appl. No.: 08/909,266

[22] Filed: Aug. 11, 1997

[51] Int. Cl.[7] .......................... H04B 7/216; H04J 13/04
[52] U.S. Cl. .................. 370/320; 370/342; 370/441; 370/468; 370/508; 375/145; 375/367
[58] Field of Search ..................... 370/320, 321, 370/335, 342, 337, 310, 312, 316, 319, 441, 442, 464, 465, 468, 479, 508, 519; 375/142, 145, 146, 149, 150, 147, 356, 367; 455/12.1, 509, 451–454

[56] References Cited

U.S. PATENT DOCUMENTS

| | | | |
|---|---|---|---|
| Re. 32,905 | 4/1989 | Baran ..................................... | 370/320 |
| 4,965,586 | 10/1990 | O'Neill et al. ...................... | 342/357.17 |
| 5,195,090 | 3/1993 | Bolliger et al. .......................... | 370/314 |
| 5,195,091 | 3/1993 | Farwell et al. .......................... | 370/336 |
| 5,260,967 | 11/1993 | Schilling ................................. | 370/342 |
| 5,276,907 | 1/1994 | Meidan ................................. | 455/436 |
| 5,278,892 | 1/1994 | Bolliger et al. ......................... | 455/442 |
| 5,305,308 | 4/1994 | English et al. ........................... | 370/335 |
| 5,313,457 | 5/1994 | Hotstetter et al. ....................... | 370/320 |
| 5,375,140 | 12/1994 | Bustamante et al. .................... | 375/142 |
| 5,410,568 | 4/1995 | Schilling ................................. | 370/342 |
| 5,444,696 | 8/1995 | Petranovich ............................. | 370/337 |
| 5,521,925 | 5/1996 | Merakos et al. ......................... | 370/337 |
| 5,623,487 | 4/1997 | Natali ..................................... | 370/342 |
| 5,734,648 | 3/1998 | Adachi et al. ........................... | 370/342 |
| 5,737,329 | 4/1998 | Horiguchi ............................... | 370/342 |
| 5,745,483 | 4/1998 | Nakagawa et al. ...................... | 370/335 |
| 5,761,196 | 6/1998 | Ayerst et al. ............................ | 370/335 |
| 5,781,540 | 7/1998 | Malcolm et al. ....................... | 370/321 |
| 5,835,488 | 11/1998 | Sugita ..................................... | 370/335 |
| 6,018,528 | 1/2000 | Gitlin et al. ............................. | 370/436 |

*Primary Examiner*—Seema S. Rao
*Attorney, Agent, or Firm*—Leonard Charles Suchyta

[57] ABSTRACT

The data communications systems disclosed herein accommodates terminals having different throughput capabilities by flexibly allocating cyclicly rotated phases of a common pseudo-noise (P/N) code. Throughput capabilities of the terminals are expressible in multiples of a preselected minimum throughput rate so that a single respective code phase is assigned to any terminal operating at the minimum throughput rate while a plurality of sequential consecutive phases are assigned to each terminal having a capability greater than the minimum throughput rate. One or more unassigned phases are provided between phases assigned to different terminals. Any terminal operating at the minimum throughput rate utilizes all time slot intervals in a predetermined frame interval while terminals of greater capability are assigned time slots in accordance with the amount of data traffic to be carried by that terminal and the number of code phases assigned thereto.

10 Claims, 12 Drawing Sheets

| P/N: | p0 | p1 | p2 | p3 | p4 | p5 | p6 |
|---|---|---|---|---|---|---|---|
| M: |  |  |  | 1 | 2 | 3 | 4 |
|  |  |  |  | - | - | a1 | a2 |
| P/N: | p6 | p0 | p1 | p2 | p3 | p4 | p5 |
| M: |  |  |  | 1 | 2 | 3 | 4 |
|  |  |  |  | a3 | a4 | - | - |
| P/N: | p5 | p6 | p0 | p1 | p2 | p3 | p4 |
| M: |  |  |  | 1 | 2 | 3 | 4 |
|  |  |  |  | - | - | - | - |
| P/N: | p4 | p5 | p6 | p0 | p1 | p2 | p3 |
| M: |  |  |  | 1 | 2 | 3 | 4 |
|  |  |  |  | - | b1 | b2 | b3 |
| P/N: | p3 | p4 | p5 | p6 | p0 | p1 | p2 |
| M: |  |  |  | 1 | 2 | 3 | 4 |
|  |  |  |  | b4 | - | - | - |
| P/N: | p2 | p3 | p4 | p5 | p6 | p0 | p1 |
| M: |  |  |  | 1 | 2 | 3 | 4 |
|  |  |  |  | - | - | - | c1 |
| P/N: | p1 | p2 | p3 | p4 | p5 | p6 | p0 |
| M: |  |  |  | 1 | 2 | 3 | 4 |
|  |  |  |  | c2 | c3 | c4 | - |

WIRELESS DATA COMMUNICATIONS SYSTEM

BACKGROUND OF THE INVENTION

The present invention relates to digital data communications systems and more particularly to such a system which flexibly accommodates terminals of different throughput capabilities.

The prior art encompasses a wide variety of schemes for encoding and multiplexing digital data streams for communication between terminals. These schemes include frequency division multiple access (FDMA), time division multiple access (TDMA), and code division multiple access (CDMA). Further, some systems have been devised which utilize various combinations of FDMA, TDMA and CDMA.

One problem with known prior art systems, however, is that they do not readily accommodate terminals of differing throughput capabilities in an integrated digital network. In particular, data communication systems utilizing satellite relay typically expect or require that all terminals interconnected in the network will have similar throughput capabilities and will utilize a common encoding and multiplexing scheme. Conventional communication systems (digital or not) using FDMA and satellite relay, or any other form of radio relay, can accommodate multiple isolated point-to-point channels of differing throughput in configurations normally referred as stove-pipe architectures, where integrated digital networking is not possible. Conventional communication systems using TDMA and satellite, or any other form of radio relay, cannot accommodate terminal transmitting at significantly different burst rates, requiring all the terminals to use antennas of approximately same diameter, TDMA systems that make use of variable-rate burst modems can accommodate channels of differing throughputs, but it does so by making very inefficient utilization of equipment at sites with relatively larger antenna diameters, where a great number of modems is required to handle communications with disadvantaged terminals. Conventional communication systems using CDMA and satellite, or any other form of radio relay, typically cannot handle reception of signals at varying power levels from different terminals, a problem normally referred as the "near-far-problem."

Among the several objects of the present invention may be noted the provision of a method and system for providing digital data communications between terminals of differing throughput capabilities; the provision of such a system in which terminals of different throughput capabilities can utilize a satellite or radio relay; the provision of such a system which efficiently utilizes the throughput capabilities of terminals of different throughput capacities; the provision of such a system which can flexibly allocate channel bandwidth and terminal transmission power in accordance with data traffic needs; the provision of such a system which can be straightforwardly implemented; the provision of such system high throughput terminals can support a number of low-throughput terminals with a single or minimum number of modem units; the provision of such a system which does not require unique components; the provision of such a system which is highly reliable and which is of relatively simple and inexpensive implementation. Other objects and features will be in part apparent and in part pointed out hereinafter.

SUMMARY OF THE INVENTION

The method of the present invention operates to provide digital data communications between terminals of different throughput capabilities, the throughput capabilities being expressible in multiples of a preselected minimum throughput rate. A common frame interval comprising a plurality of time slots is established with each time slot interval comprising a predetermined plurality of bit or symbol intervals, the number of bit intervals being essentially equal to the number of bits which can be transmitted during a time slot interval at the preselected minimum throughput rate. The r.f. signal is modulated as a function of the baseband signal to be transmitted during each time slot interval, with no signal power transmitted during the symbol intervals prepended to the left of the modulated signal. Data being transmitted is modulated in accordance with at least one pseudo-noise (P/N) code, the code comprising a predetermined multiplicity of chips, there being a preselected number of P/N chip intervals within each bit or symbol interval. The code is usable, by cyclic rotation, in each bit interval at a number of different phases corresponding to the predetermined number of chips. Any terminal operating at the minimum throughput rate is assigned a single respective phase while a plurality of consecutive phases are assigned to terminals having capabilities greater than the minimum throughput rate. One or more unassigned phases are provided between phases assigned to different terminals. For each terminal of capability greater than the minimum, a number of time slots is assigned in accordance with the amount of traffic to be carried by that terminal and the number of code phases assigned thereto. A terminal operating at the preselected minimum throughput rate utilizes all time slots.

In accordance with various preferred aspects, transmissions from different terminals are performed in blocks, using the same modulation scheme with carrier frequencies corrected for the uplink Doppler effect and synchronized within a predetermined frequency interval, with symbol clocks derived from these system wide synchronized carrier frequencies, and with transmission times synchronized within a predetermined time synchronization interval. These signals are received at a determined end point after traversing satellite or terrestrial radio channels that are not necessarily identical as far as impulse response, multipath, delay, nonlinear distortions, and Doppler effects. The resulting signal at a determined end point is a superposition of channel-modified versions of the transmitted signals, further corrupted by channel and receiver front-end noise. Each component of the aggregate signal is pre-corrected for the uplink Doppler during transmission and manifests itself with an arbitrary time offset within the time synchronization interval, with an arbitrary frequency shift within the frequency synchronization interval, and with an arbitrary carrier phase. The time synchronization interval and the frequency synchronization interval are determined by the accuracies of the frequency sources at each terminal, by the maximum Doppler frequency shifts, and by the specifics of the time and frequency synchronization mechanism used.

Blocks received from different terminals will not perfectly align with each other, nor perfectly align with respect to the receivers local block clock. Corresponding symbols in blocks received from different terminals will also not align with respect to each other nor with respect to the local symbol clock. Also the relative block and symbol alignments will change with variations in the channel propagation delays as well as with changes in the various clock sources at the various terminals. Detection of such a signal, when performed using standard CDMA practices using sliding correlators or filters matched to the various code P/N codes will, in general, result in unacceptable signal quality due mainly to the partial cross-correlations among the non-aligned pseudo-noise sequences. A set of techniques are provided that combine (1) a transmission technique that eliminates interference between consecutive blocks, (2) a block synchronization technique performed onto the aggregate received signal that practically eliminates partial cross-correlations, (3) a match filtering signal detection technique using cyclically-rotating correlations that allows simultaneous detection of signals transmitted from multiple terminals, as well as the methods of synchronizing the carrier frequencies and combining these transmission, block synchronization and cyclically-rotating correlations, differential encoding and signal detection.

Signal detection is performed block by block, each block comprised of multiple multilevel symbols received simultaneously from predetermined set of remote terminals. The specifics of the block composition as well as the number and identities of remote terminals transmitting simultaneously within a block interval may vary from block interval to block interval according to the time plan defined for the network, this time plan being static or dynamic. Standard practice symbol clock synchronization techniques allows tracking of such clocks on a per transmitting terminal basis. A method is provided for recovering such symbol clocks for multiple signals received.

BRIEF DESCRIPTION OF THE DRAWINGS

FIG. 8 illustrates the output of the correlator of FIG. 7 for the various phases of the P/N sequence and for various positions of the selector switch employed therein;

Corresponding reference characters indicate corresponding parts throughout the several views of the drawings.

DESCRIPTION OF THE PREFERRED EMBODIMENT

Figure 1:
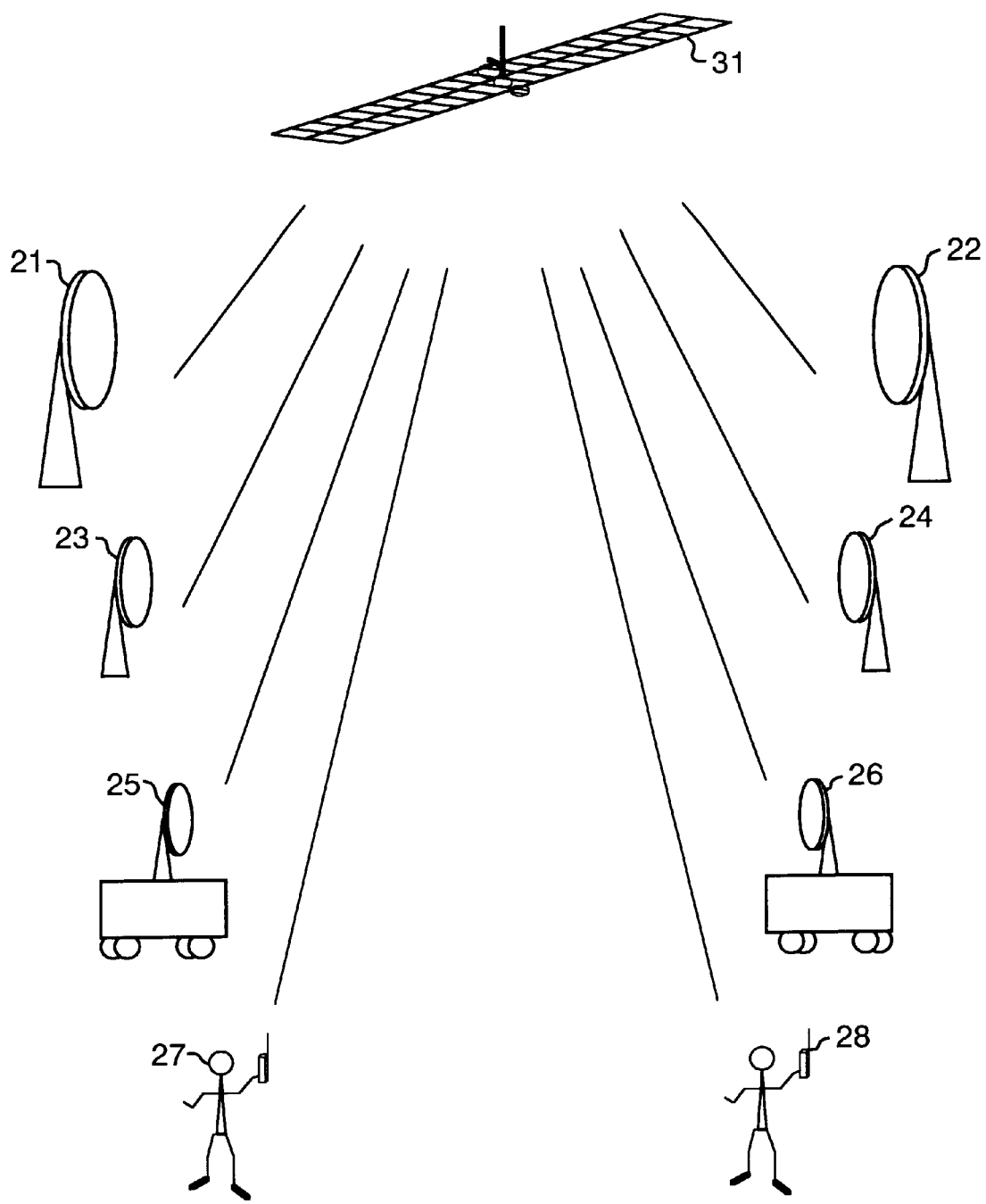
FIG. 1 is a diagram illustrating a digital network including a plurality of ground terminals of differing data throughput capabilities communicating in accordance with the present invention via a satellite relay.

Referring now to FIG. 1, the representative digital data communication system illustrated there involves a variety of terminals 21–28 of differing data throughput capabilities communicating with each other through a relay satellite 31. As is understood by those skilled in the art, most communication satellites operate essentially as active reflectors with no significant processing or buffering of data passing through the satellite. Typically, the only processing provided is to extract the modulated signal from the uplink carrier and apply it to the downlink carrier.

As indicated previously, the present invention accommodates terminals of differing data throughput capabilities. In the network of FIG. 1 for example, two of the terminals (21 and 22) are assumed to be relatively large size fixed terminals, e.g. having antenna dishes ranging in the three to five meter diameter range, with transmission power in the range of 25 to 100 watts. Terminals 23 and 24 are assumed to be of a nominal medium size, e.g. having antenna dish diameters in the range of 1.2–2.4 meters, and transmitting power in the 10 to 25 watt range. Terminals 25 and 26 are assumed to be relatively small, e.g. transportable terminals, i.e. having antenna dish diameters under 60 centimeters, and transmitting power in the range of 5 to 10 watts.

As is understood, transmitting power and antenna size essentially define or limit data throughput capability, i.e. the data rate which can be supported with an acceptable bit error rate (BER). Stated another way, a given power budget will support a given data rate for a given error rate.

In describing the present invention and the example illustrated, it is useful to define a preselected minimum throughput rate, e.g. the data throughput rate for the most disadvantaged channel which will be supported by the system. In the embodiment being described by way of example, this minimum throughput rate is 32 kbps (kilobits per second). The capability of terminals having greater throughput capabilities can then be expressed in multiples of the minimum throughput rate. As will be understood, it is not necessary that the network actually include any terminals operating at the preselected minimum throughput rate but that value is useful as defining the minimum increment of throughput or bandwidth which will be allotted in a given implementation of the present invention.

In accordance with one aspect of the present invention, CDMA encoding is utilized in a particular manner so as to enable flexible allocation of channel capability or bandwidth. In the CDMA encoding, the presence of a data bit is represented by a pseudo-noise (P/N) code comprising a predetermined multiplicity of chips. A carrier modulated with the code essentially has its spectrum spread. As is understood, the code can then be detected at the receiving end by a correlator or matched filter. In the embodiment being described by way of example, the P/N code is 511 chips in length. Rather than using a plurality of different and non. orthogonal codes, the preferred embodiment utilizes a single or common code and multiple access is implemented by utilizing cyclic rotations of the code. Each one chip shift of the code can be considered to be a separate phase, there being 511 phases for possible distinguishable rotations of the code. The receivers utilize a rotating correlator to search through or examine for all possible phases of the P/N code sequence during each bit interval. An advantage of this scheme is that a single rotating correlator can detect the data in several channels, it being transmitted from different terminals. Thus multiple modems, one for each channel, are avoided.

Figure 2:
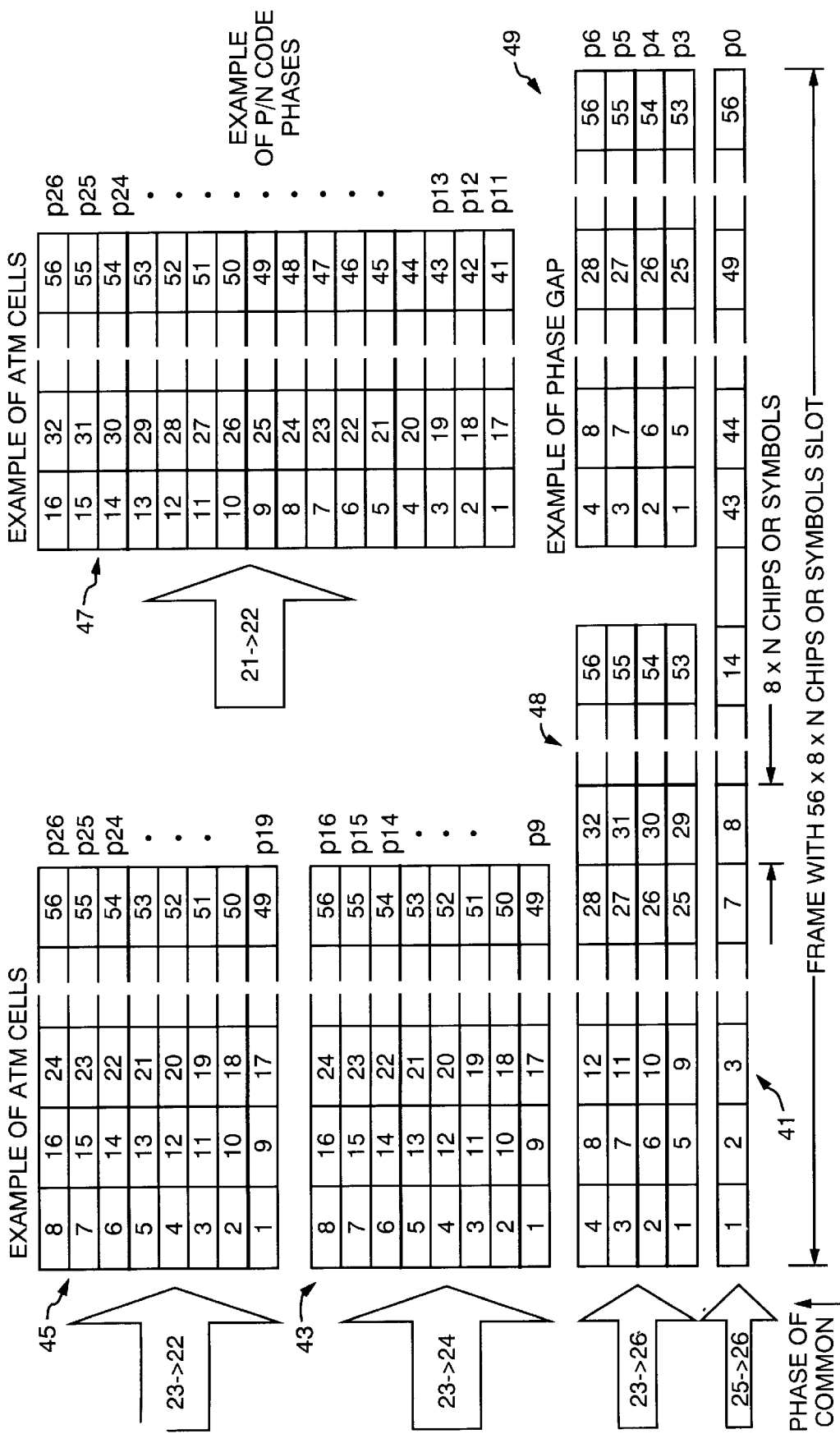
FIG. 2 is a diagram illustrating the method of channel or bandwidth allocation employed by the method of the present invention.

FIG. 2 illustrates the combined TDMA/CDMA channel capacity allocation scheme employed in the system being described by way of example. As is understood, data communication networks are increasingly using a form of data packetizing known as ATM (asynchronous transfer mode). Accordingly, for purposes of illustration, it is convenient to describe the present invention in a context where ATM cells are being communicated between terminals. Whereas a standard ATM cell is 53 bytes, the scheme illustrated in FIG. 2 establishes a frame interval of 56 bytes or time slots to provide spares for control overhead and Forward Error Correction or FEC. By sending one byte during each time slot, a terminal operating at the preselected minimum throughput rate can thus send one ATM cell during each frame. Each time slot is divided into eight bit times or intervals and each bit interval can further be considered to be divided into 511 chip intervals. Further, for reasons described in greater detail hereinafter, a number of unused chip intervals are provided between each bit interval (not shown in FIG. 2).

Because the inherent limitations of a terminal capable of only the minimum throughput rate, only one phase or version of the P/N code is assigned to any terminal or channel operating at the minimum throughput rate. In other words, only one bit or symbol is sent during each bit interval. Such a channel is indicated at reference character 41 in FIG. 2. Different embodiments of this invention can use either coherent or differential encoding/detection, with the former being used in the preferred embodiment of this invention. For simplicity of explanations the preferred embodiment with coherent detection is assumed in the description that follows.

A terminal with intermediate throughput capabilities, however, is allocated a corresponding plurality of phases. For example, the terminals 23 and 24 which are of intermediate capability, i.e. 256 kbps, can communicate using channels employing 8 phases of the P/N code. In other words, the rotating correlator can extract the codes separately from 8 different phases and maintain the specified bit error rate. Such channels are indicated at reference characters 43 and 45 in FIG. 2. Correspondingly larger terminals can handle and resolve even a higher density data rate and thus a correspondingly larger number of the allocable phases. A channel twice as large is indicated at reference character 47 while channels half as large are indicated at reference characters 48 and 49. Further, the large terminals 25 and 26 capable of 2048 kbps can be assigned as many as 56 phases so that a complete ATM cell can be sent during each time slot. Since the larger capacity terminals can transmit complete ATM cells in less than a frame length, different time slots within a frame can be allocated to different terminals and/or channels. As will be understood, the capability of a channel linking two terminals is essentially established by the least capable of the terminals involved in the channel.

As illustrated, phase gaps, i.e. unused phases of the common P/N code, are provided between channels using the same time slots. The number of unused phases is selected in accordance with the range of block level resynchronization which may need to be provided, as described in greater detail hereinafter.

Figure 3:
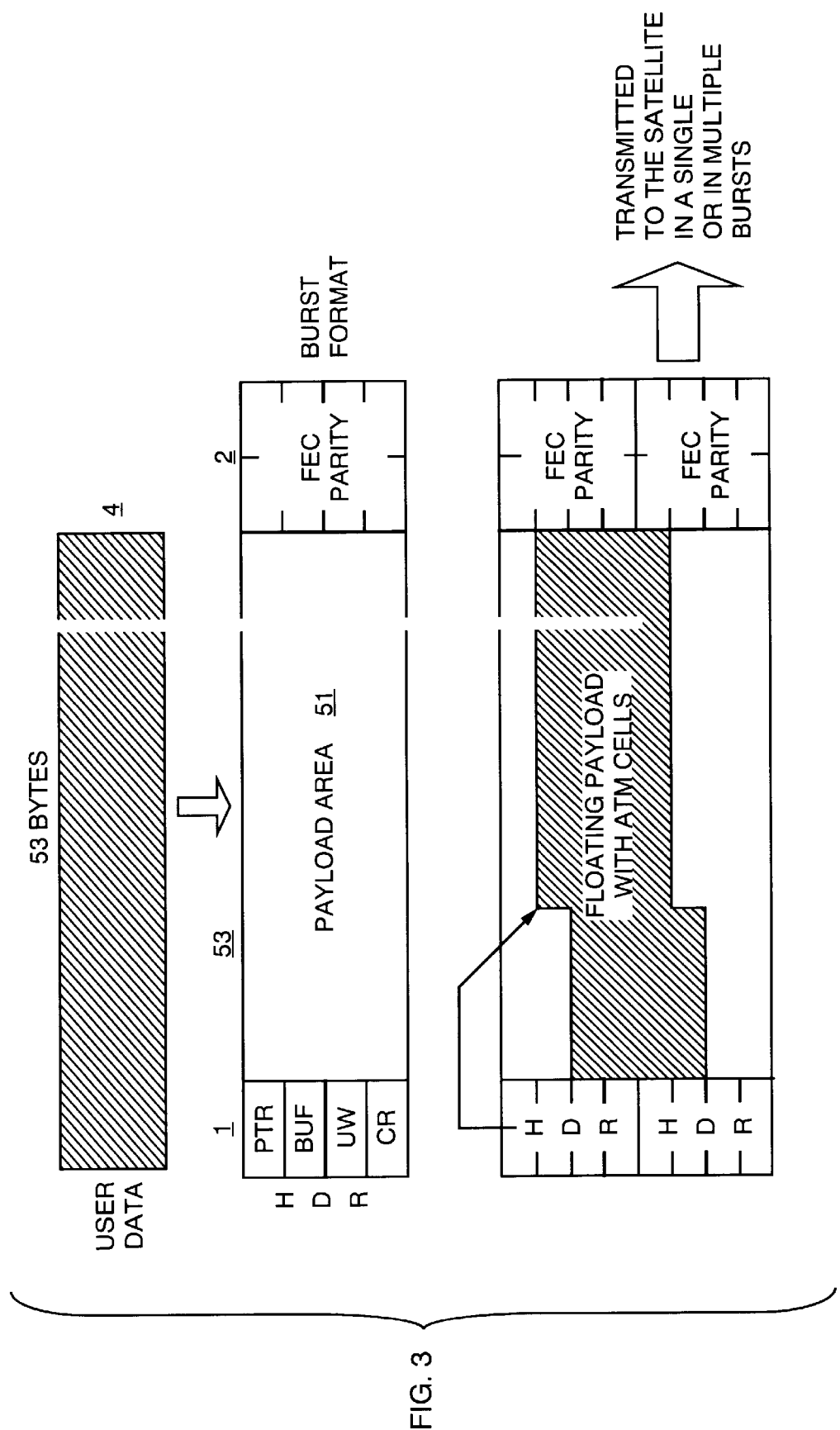
FIG. 3 is a diagram illustrating the processing performed onto the end user data in preparation for its transmission over satellite.

As indicated, the data frame length contemplated includes, in addition to the number of bytes required for an ATM cell, a number of bytes which can be used for overhead or guard zones. FIG. 3 represents a transmission burst format which includes system control bytes which facilitate a block and phase resynchronization as described in greater detail hereinafter. It is further contemplated that user data, i.e. the ATM cells, be sent in groups of four together with system control bytes and forward error correction bytes. As is understood by those skilled in the art, forward error correction is useful in restoring the integrity of digital data transmission subject to some predictable bit error rate (BER). As is also understood by those skilled in the art the four ATM cells do not necessarily have to be transmitted in sequence of each other, allowing therefore greater flexibility on bandwidth allocation.

As illustrated in FIG. 3, the data format includes a payload area identified by reference character 51 which comprises four sequential ATM cells of 53 bytes each. The data structure also includes a header 53 which includes bytes providing a pointer (PTR), a buffer designator (BUF), a unique word (UW), and a carrier phase recovery (CR) byte. As described hereinafter, the unique word is used for block level timing resynchronization while the carrier phase recovery byte (CR) is used to resynchronize carrier phase, again as described in greater detail hereinafter.

In order to facilitate accommodation of user needs, it may also be useful to allow payload to in a sense "float" within the payload areas of a succession of burst transmissions and the pointer byte (PTR) is employed to identify the starting byte position within the payload region as illustrated in the bottom portion of FIG. 3.

Figure 4:
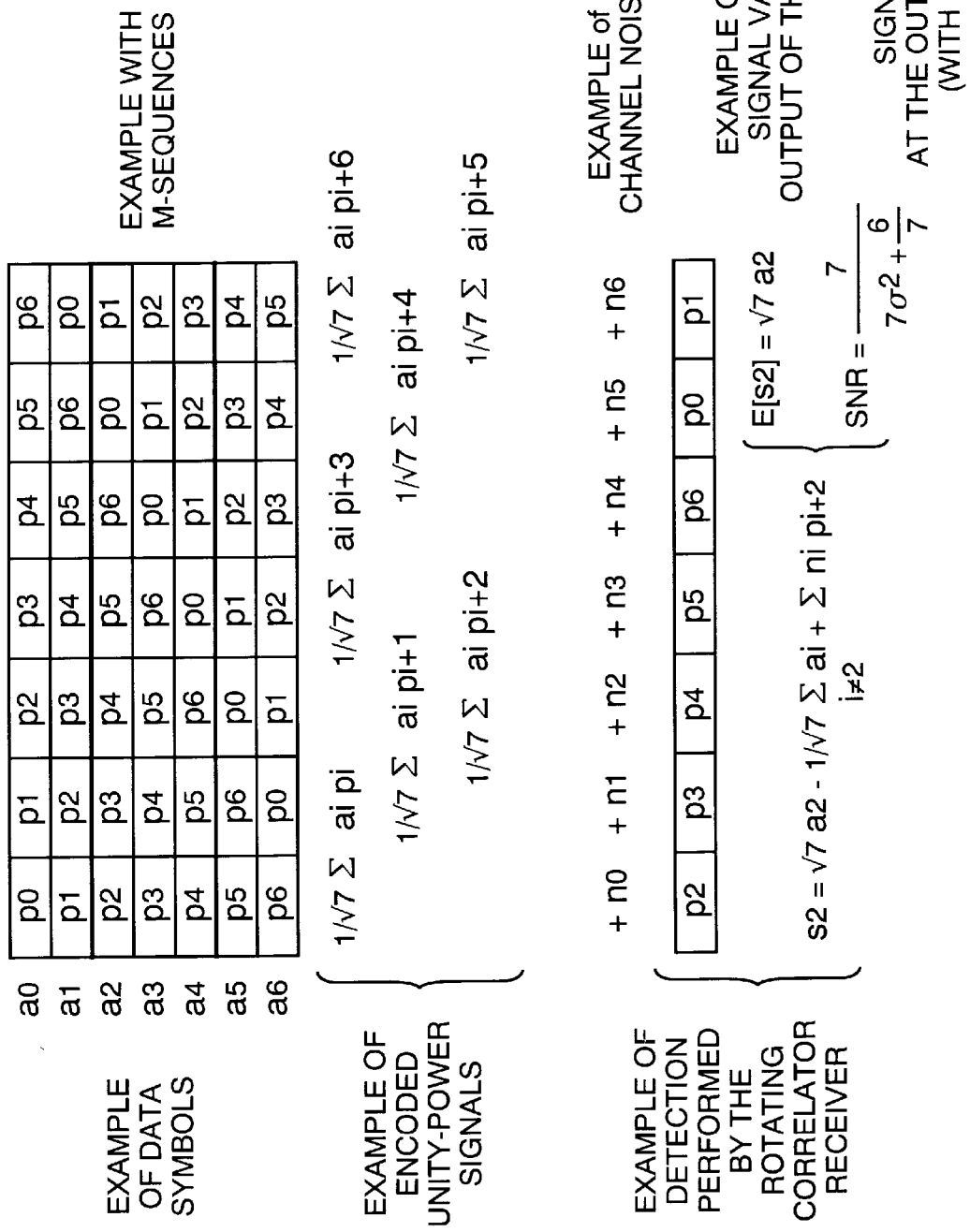
FIG. 4 is a diagram illustrating the basic encoding and detection process.

FIG. 4 illustrates the basic detection process for a simplified example where the pseudo-noise code employs only seven chips (P0–P6) and successive bits or symbols a0–a6 are encoded on successively shifted phases of the P/N code. As is understood, some information about the transmitted bits or symbols is present in all chip times of the P/N code. After the correlation, the information about a specific symbol or bit is contained essentially in one chip time slot which corresponds to the time instance where the received signal is correlated in alignment against the P/N code assigned to that signal during the encoding process. Unassigned P/N code phases in the CDMA encoding process result in time gaps after the correlation.

As illustrated in FIG. 4, the signal amplitude during each chip time is a sum of all the contributing bits and chips, i.e.

$$\frac{1}{\sqrt{7}} \sum a_i p_{i+6}$$

for the last chip interval. There will also be some contributed noise, designated as n0–n6. The bottom portion of the figure illustrates the detection performed by the rotating correlator receiver, e.g. for the third data bit or symbol a2 and the signal strength and signal-to-noise ratio are similarly shown.

As is understood, the best discrimination or detection is obtained when the selected pseudo-noise code is essentially orthogonal with itself for all chip positions other than exact alignment—an ideal situation typically not perfectly achievable. It is known, however, that so-called M-sequences have an autocorrelation function which outputs −1 at all shifted bit positions, with exact alignment providing an output equal to N at exact alignment. This behavior is, of course, based on the assumption that each shifted autocorrelation is determined at shift points exactly equal to integer multiples of the chip interval, again a result typically not perfectly achievable. Accordingly, in a practical receiver, the composite received signal will be sampled at a multiple M times within each chip interval (e.g. M=4), correlations will be performed M times using every other M sample, and an empirical fitting will be performed to select the sampling point (i.e., sampling phase) that maximize the signal-to-noise ratio function.

While the embodiment being described by way of example assumes that a single bit is transmitted during each bit or symbol interval, it should be understood that, if the modulation process allows multi-level transmission, more than one bit can be encoded in each symbol. In other words, the data symbols a0–a6 may, in fact, comprise amplitude levels rather than just binary bits.

As is described in greater detail hereinafter, the bandwidth allocation scheme of the present invention requires relatively accurate synchronization of the transmissions so that bursts sent from different ground terminals arrive at the satellite at essentially the same time. Since complete synchronization may not be possible, a guard band is established by providing one or more unused or unassigned phases between the phases assigned to different terminals/channels as indicated previously.

The length of the code gaps is assigned according to the relative synchronization accuracy. For example, one code phase gap can be assigned to terminals that are synchronized within ±one-half of a chip interval and that are transmitting simultaneously (e.g., in the same byte slot), two code phase gaps may be assigned to terminals synchronized within ±one chip interval, and so on.

Figure 5:
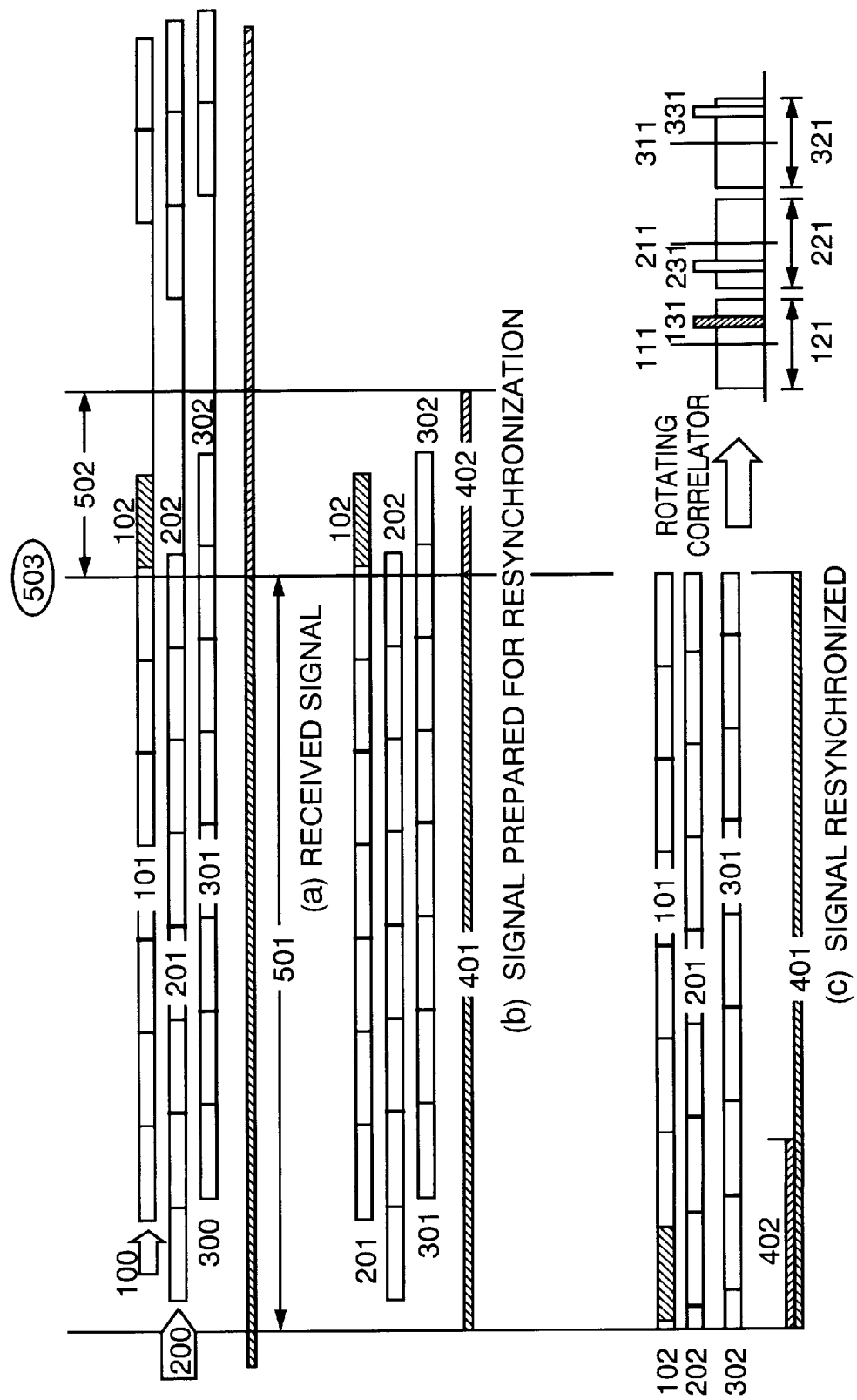
FIG. 5 is a diagram illustrating the signal block resynchronization performed by the burst demodulator directly onto the aggregate signal received from a multitude of transmitters.

As understood by those skilled in the art, utilization of the above code gaps will not be enough by themselves to eliminate partial cross correlations caused by block-level misalignments among the received signals and/or between these signals and timing events derived from a local reference clock. As understood, these block misalignments will manifest themselves, in the general case, as a combination of an integer number chip times plus a fraction of a chip time. In accordance with an important aspect of the present invention, a transmission strategy and various mechanisms used resynchronize the received aggregate signal to the local clock reference are employed as illustrated in FIG. 5.

As indicated previously, a time gap is provided between successive blocks of chips, i.e. between successive bits or symbols in a channel of minimum capability. FIG. 5a illustrates the nature of a typical received combined signal originating from three different terminals (100, 200, 300), each terminal transmitting at the minimum throughput capacity, i.e. one bit or symbol per block time. These three transmitted signals may arrive with some time misalignment or staggering as illustrated. The misalignments, however, are smaller than the time gap between blocks so that the receiver can establish a synchronization window 502 (FIG. 5a) having starting and end points which fall within the time gap for all the received signals. The receiver also establishes a cutoff point (503) which precedes the end point by an interval essentially roughly equal to the time gap so that it will fall within the block (501) of transmitted chips for all of the contributing received signals. As indicated previously, the received signal is sampled at multiple times during each chip interval and, in accordance with another aspect of the present invention, the samples taken after the cutoff point are transferred back and added to the front of the synchronization window. To the extent that any chips from the end of a block of chips are transferred to the beginning of the block that transfer does not destroy the code sequence but merely causes it to be detected as a shifted code phase. Stated another way, the signal at the right of the cutoff boundary is the complement of what is needed to create perfectly aligned blocks. So long as the maximum number of code phase shifts resulting from this resynchronization technique are less than the number of code phase gaps provided between different channels as described previously in relation to FIG. 2, the receiver can separate the received codes from one channel from those received in another channel.

FIG. 5c illustrates the resynchronized signal with corresponding noise components. As will be understood, there is a slight performance degradation caused by the resynchronization process due to extra noise 402 added at the beginning of the block. However, in typical situations, assuming the utilization of standard practice CDMA synchronization techniques, the synchronization adjustment needed to realign the chip blocks is in the order of a couple of chips and consequently the extra noise added at the beginning of the block is negligible as compared with the total number of chips.

When the received signals are perfectly synchronized with the local block boundaries, all the individual received signal components from different terminals (100, 200 and 300) would be aligned with the center line of the synchronization window. As understood, in this situation of perfect alignment, the corresponding detected signals at the output of the rotating correlator would in their nominal center posisitons (111, 211 and 311), each position corresponding to the relative phase of the assigned phases of the P/N codes. In the case of synchronization uncertainties, as illustrated in FIG. 9b, the received signals after being re-synchronized, are presented to the rotating correlator as if they were received with slightly different P/N code phases and the corresponding detected signals at the output of the rotating correlator will occur in the neighborhood of the above nominal center positions (131, 231 and 331), with maximum deviation bounded by half of the length of the synchronization windows (121, 221, 321).

Figure 6:
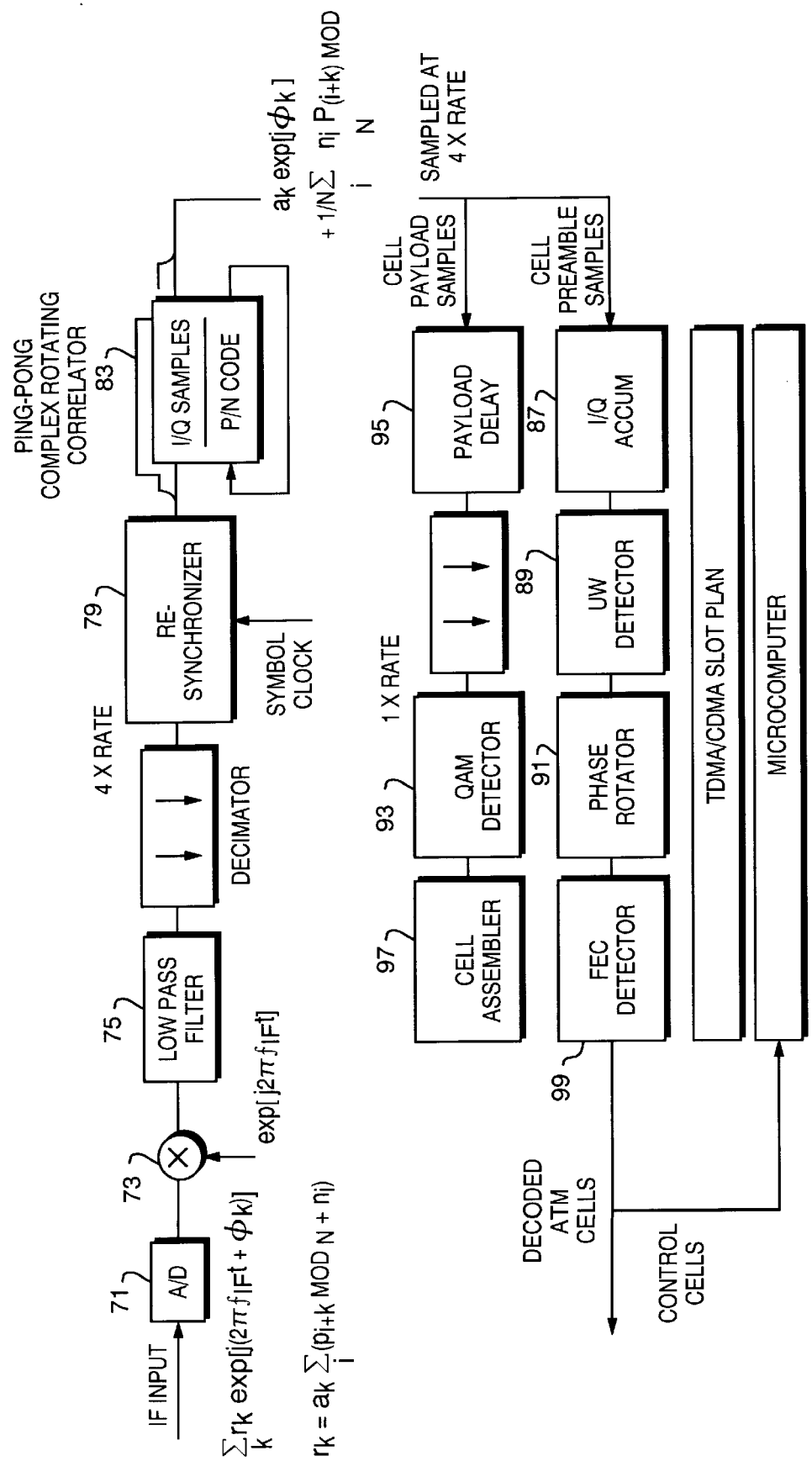
FIG. 6 is a block diagram of the burst demodulator employed in the system of FIG. 1.

FIG. 6 illustrates the burst demodulator which operates to regenerate the ATM cells encoded in accordance with the P/N code phases assigned to the respective transmitting terminals. As understood, the signal from different terminals is received with arbitrary carrier phase offset and symbol timing misalignments. The amplitude matching and the phase orthogonality of the in phase (I) and quadrature (Q) channels employed in the receiver of FIG. 6 are extremely critical. Accordingly, the preferred embodiment makes use of direct sampling techniques, in which the IF signal is sampled, digitized, and the resulting complex signal is processed digitally. As understood, this approach eliminates the analog filters and amplifiers that tend to be the major sources of error in conventional receivers. Since the I and Q components of the complex signal are formed using digital techniques in the direct IF conversion receiver, problems related to I and Q matching are effectively eliminated. Whereas the digital processing can be carried on with sampling at the Nyquist rate, the detection method of this invention is preferably described by assuming oversampling (e.g. at four times the maximum frequency or twice the Nyquist rate).

The composite received signal is down converted using the frequency adjustment schemes described with reference to FIGS. 9–12 to obtain an intermediate frequency (IF) input to the digital processing system. As illustrated in FIG. 6, this IF input signal is applied to an A/D converter 71 to obtain a string of digital samples. These samples are mixed digitally with a complex local clock signal, i.e. in mixer 73, to obtain a complex baseband signal which is passed through a digital low pass filter 75. Block level resynchronization, as described with reference to FIG. 5 is performed as indicated at the block 79. The rotating correlator which extracts the bits or symbols from the digital data stream is indicated at reference character 83. Assuming, as is preferred, that computation is being performed on a complex signal basis, there will effectively be two rotating correlators, one for the in phase (I) and one for the quadrature (Q) components as indicated previously.

The samples corresponding to the cell preamble, i.e. the overhead bytes, are accumulated as indicated at reference character 87 and the unique word byte is detected as indicated at block 89. Detection of the unique word allows identification of the phase which provides the best detection of the unique word and thus also the data payload. This phase identification is utilized by a phase rotator 91 to apply the best phase to a QAM (quadrature amplitude modulation) detector 93 which demodulates the payload. The payload or user data samples are applied to the detector 93 through a suitable delay 95 which allows for the unique word detection described previously. The bits comprising each ATM cell are then assembled as indicated at block 97 with forward error correction (FEC) being applied as indicated at block 99.

Figure 7:
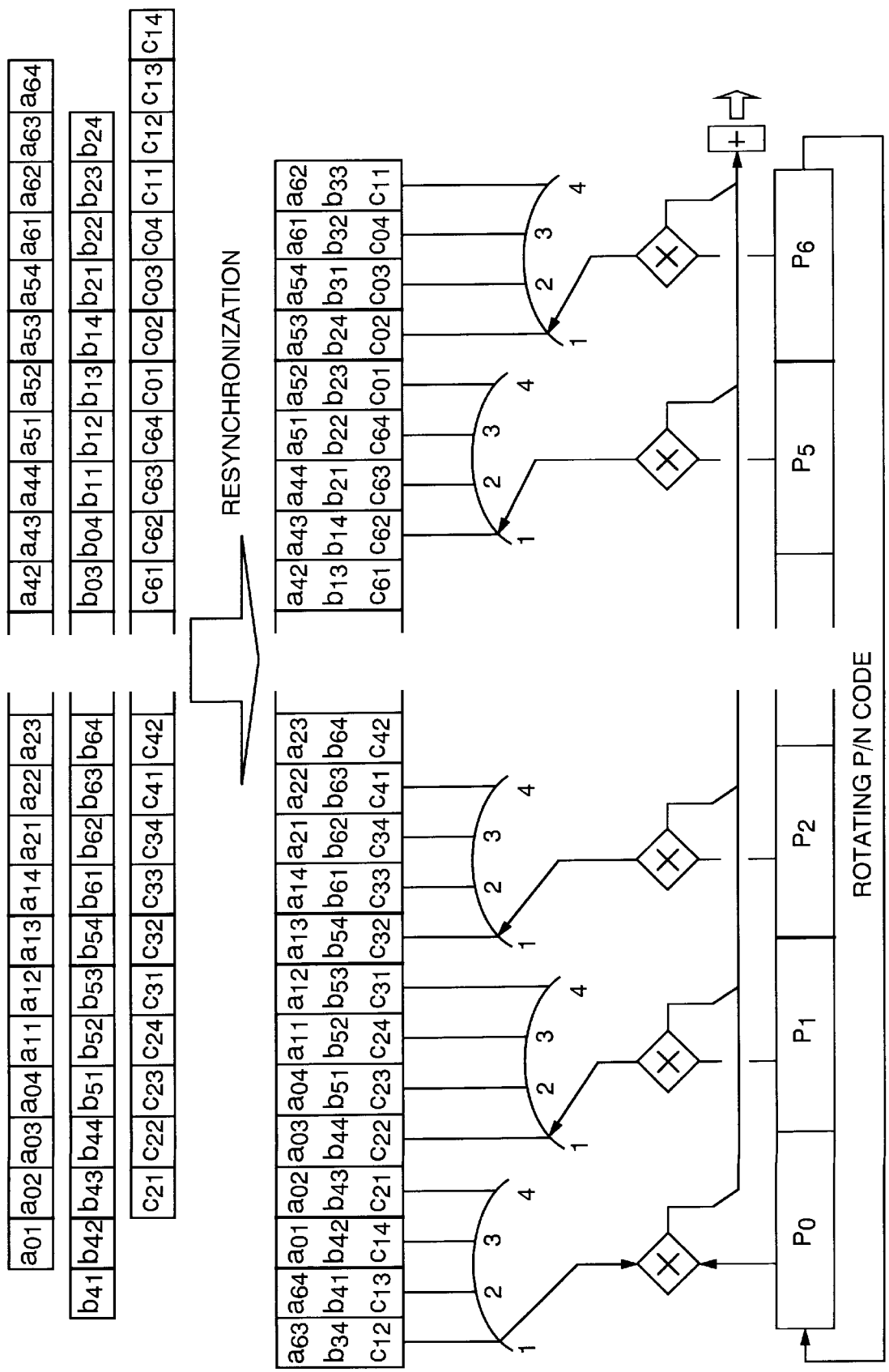
FIG. 7 is a block diagram of the rotating correlator employed in the burst demodulator of FIG. 6.

FIG. 7 illustrates the basic processing performed by the rotating correlator 83 on the resynchronized signal using a simplified example having a P/N sequence of length only seven chips and for data received from three different minimum throughput channels. FIG. 8 is similarly a table illustrating the output of the correlator of FIG. 7 for the various phases of the P/N sequence and for various positions of the switch. As will be understood, the switch is sequenced through all four positions (corresponding to the different samples taken during each chip interval). On succeeding chip intervals, the P/N code is rotated through the shift register which holds the P/N code and against which the sampled data is correlated.

The signal at the output of the rotating correlator for a cell received from the kth terminal still contains the carrier phase difference Øk, measured at the phase rotator (91) using the rotating correlator outputs corresponding to the Unique Word (UW) and Carrier Recovery (CR) sequences in the burst overhead of each cell, as illustrated in FIG. 3. This measured carrier phase Øk is used by the QAM detector (93) to rotate the in-phase and quadrature components of the payload, payload pointer, virtual buffer and FEC parity bits before the resulting detected data is made available to the Cell Assembler (97).

Figure 9:
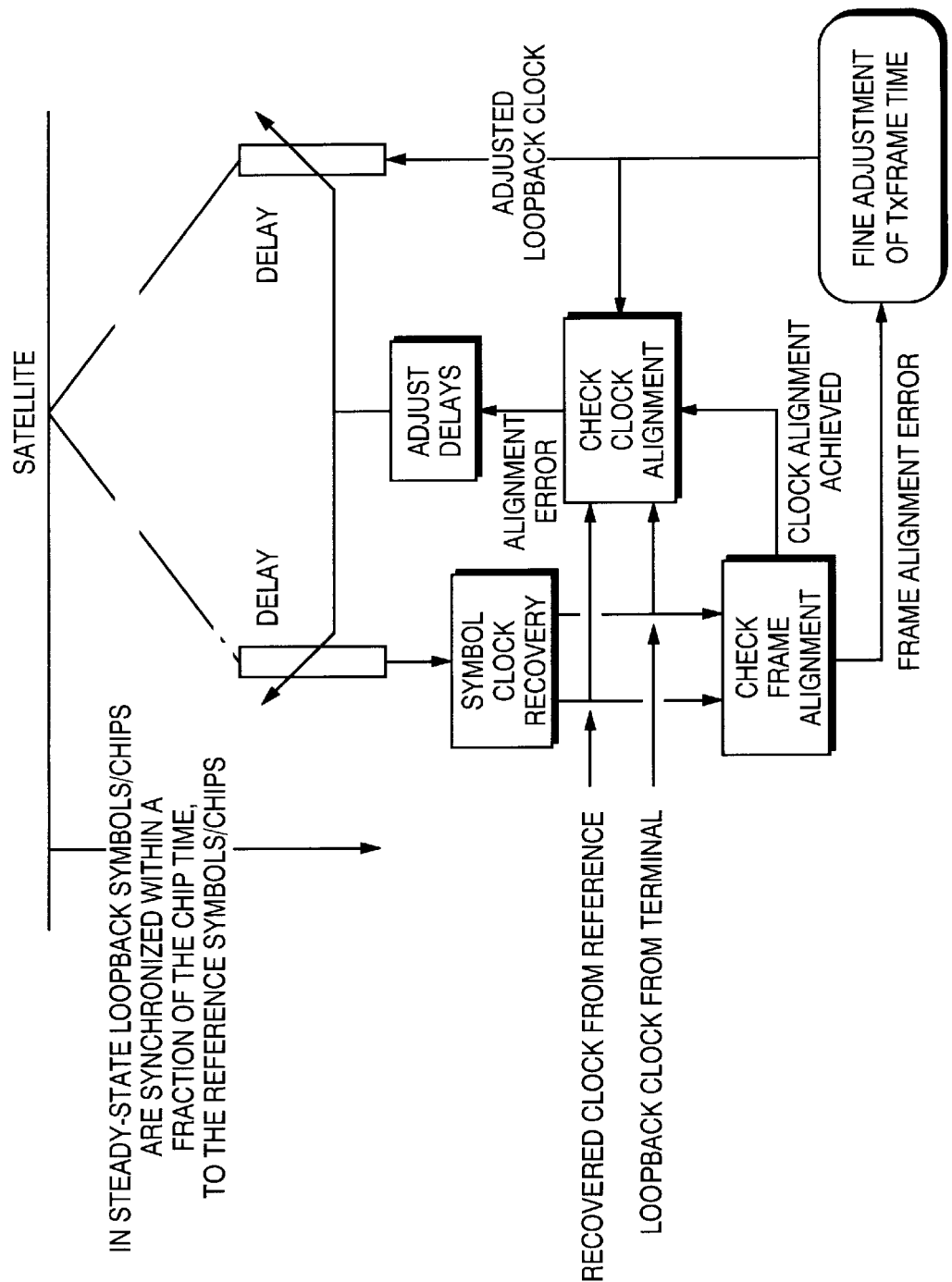
FIGS. 9–12 are block diagrams of a system for establishing symbol timing and carrier frequency synchronization employed in the network of FIG. 1.
Figure 10:
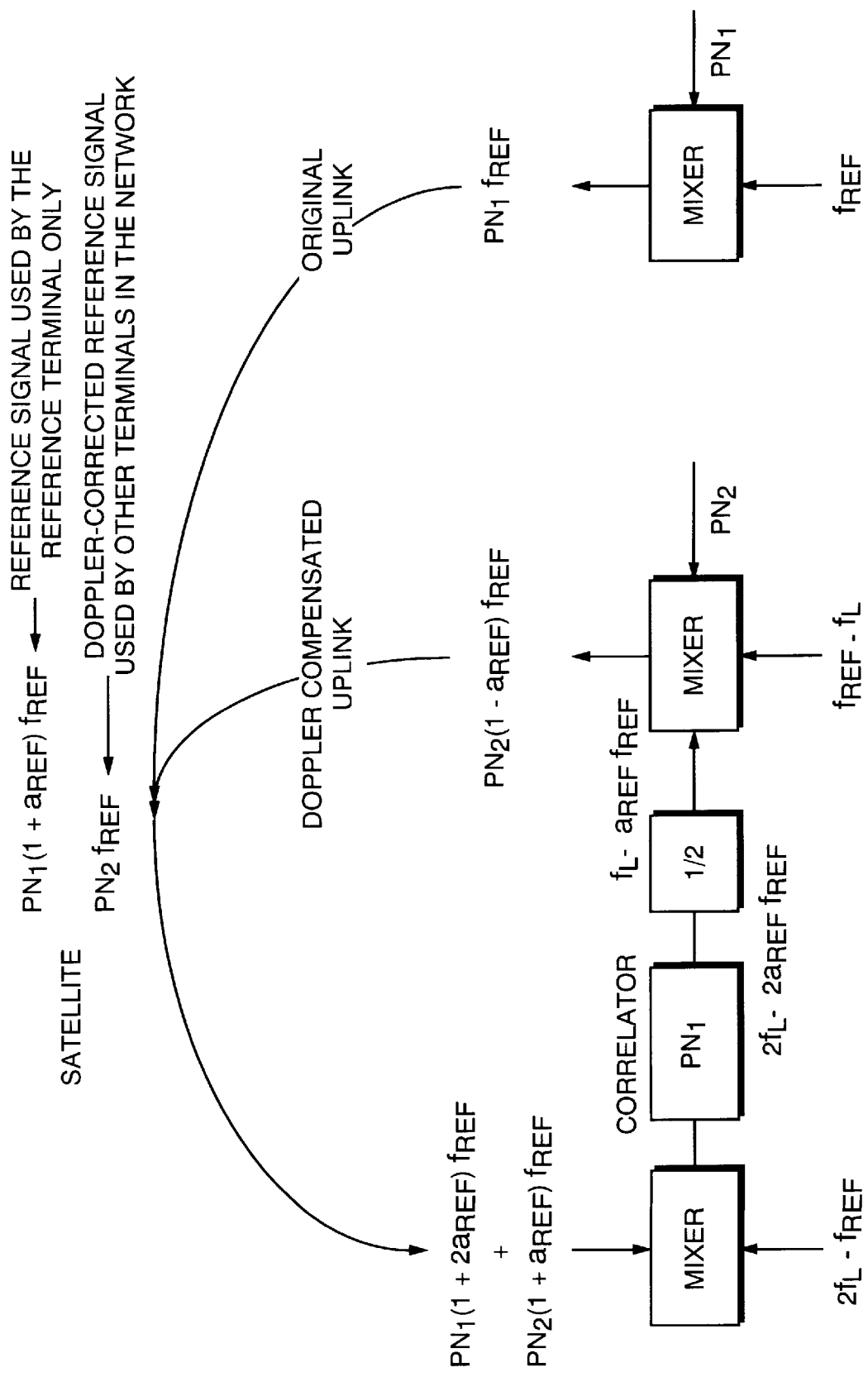
Figure 11:
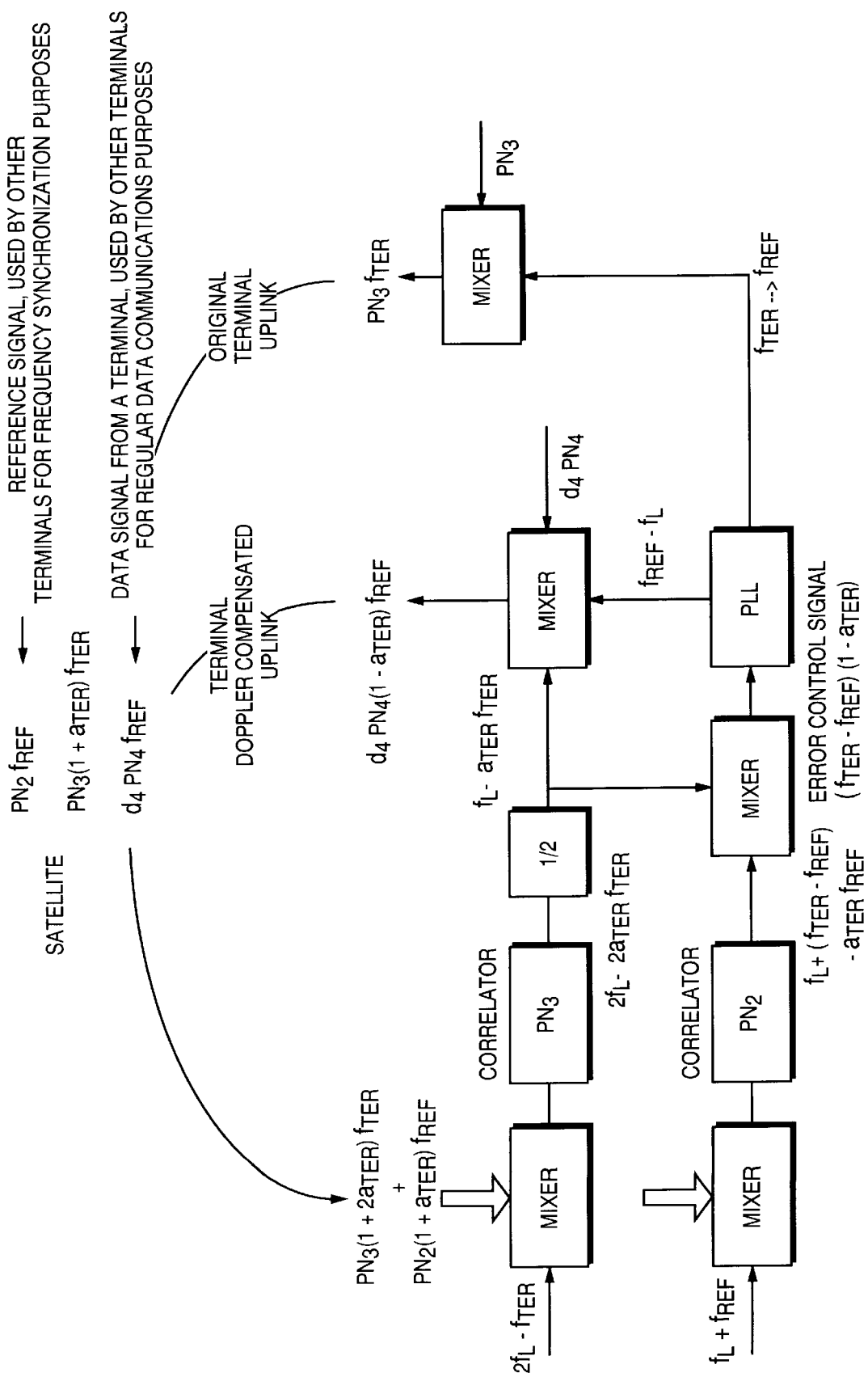

FIGS. 9–11 illustrate a system known in the art for maintaining synchronization within the various terminals comprising the networks so that transmissions from different terminals arrive at the satellite relay essentially simultaneously.

When the data bits within a block come from geographically-separated users, symbol-level synchronization must be maintained. If the timing from different ground terminals is not aligned within a small-fraction of the symbol-period, the intersymbol interference effects are such that they can adversely impact the performance of the TDMA/CDMA multiplexing scheme utilized in the present invention.

In the embodiment illustrated, synchronization is obtained by: (1) equalizing as illustrated in FIG. 5 the electrical delays in the uplink and downlink paths to a small fraction of the chip-time using frequent comparisons between transmissions received from a terminal assigned as "reference" with loopback signals, (2) performing cell-frame synchronization using conventional TDMA ranging techniques, and (3) performing system-wide symbol clock synchronization. These are essentially techniques successfully implemented in the ACTS Gigabit Satellite Network for Ka-band TDMA transmissions at even higher data rates (e.g., 696 Mbit/s).

Preferably when the data bits within a block come from geographically-separated users, symbol-level synchronization must be maintained for optimum performance (i.e., minimization of the time gap between consecutive spreaded signals. Although such synchronization is preferred, it is not required nor essential for the purposes of this invention. Eventual symbol-timing misalignments intersymbol interference effects are taken care by the resynchronization mechanisms and by the perfectly-orthogonal characteristics of the spreading sequences being used in this invention.

In the embodiment illustrated in FIG. 9, synchronization is obtained by: (1) equalizing the electrical delays in the uplink and downlink paths to a small fraction of the chip-time using frequent ranging measurements using loopback signals, (2) performing cell-frame synchronization using conventional TDMA ranging techniques, and (3) performing system-wide symbol clock synchronization.

In the embodiment described, frequency synchronization and Doppler effect compensation are also provided. Frequency-synchronized signals lead to simpler overall receivers. Doppler-compensated signals that are frequency-synchronized at the satellite are particularly important for simplifying the carrier recovery process at distributed receivers. In the preferred satellite network, one of the ground terminals, assigned as "reference", transmits a frequency-reference signal that is tracked by all ground terminals. The system, illustrated in FIG. 10 for the Reference Terminal, and in FIGS. 11 and 12 for all other ground terminals, is based on closed-loop comparisons between the reference signal and loopback signals multiplexed together using CDMA techniques. The Doppler-effect differs from ground terminal to ground terminal and, in the figures, we illustrate the various signals in terms of their nominal frequencies, spread spectrum codes (i.e., PN-sequences), and Doppler factor.

FIG. 10 illustrates by way of an example the signals and operations used by the reference terminal to generate a reference frequency at the satellite ($f_{REF}$) that is corrected for its own Doppler frequency factor ($a_{REF}$). In the embodiment of FIG. 10 the transmitted and received signals are represented by $d_i\, PN_j\, f_k$ where $d_i$ is the data part (a constant "1" in the case of the reference terminal transmissions), $PN_j$ is the P/N code used to spread the signal, and $f_k$ is the carrier frequency. As shown, at reception, and using standard practice signal mixing techniques, the reference terminal measures the combined uplink and downlink Doppler effect (2 $a_{REF}$) using the signal encoded with $PN_1$ and generates a Doppler-compensated uplink signal, transmitted encoded with $PN_2$, and available at the satellite as $PN_2\, f_{REF}$.

Figure 12:
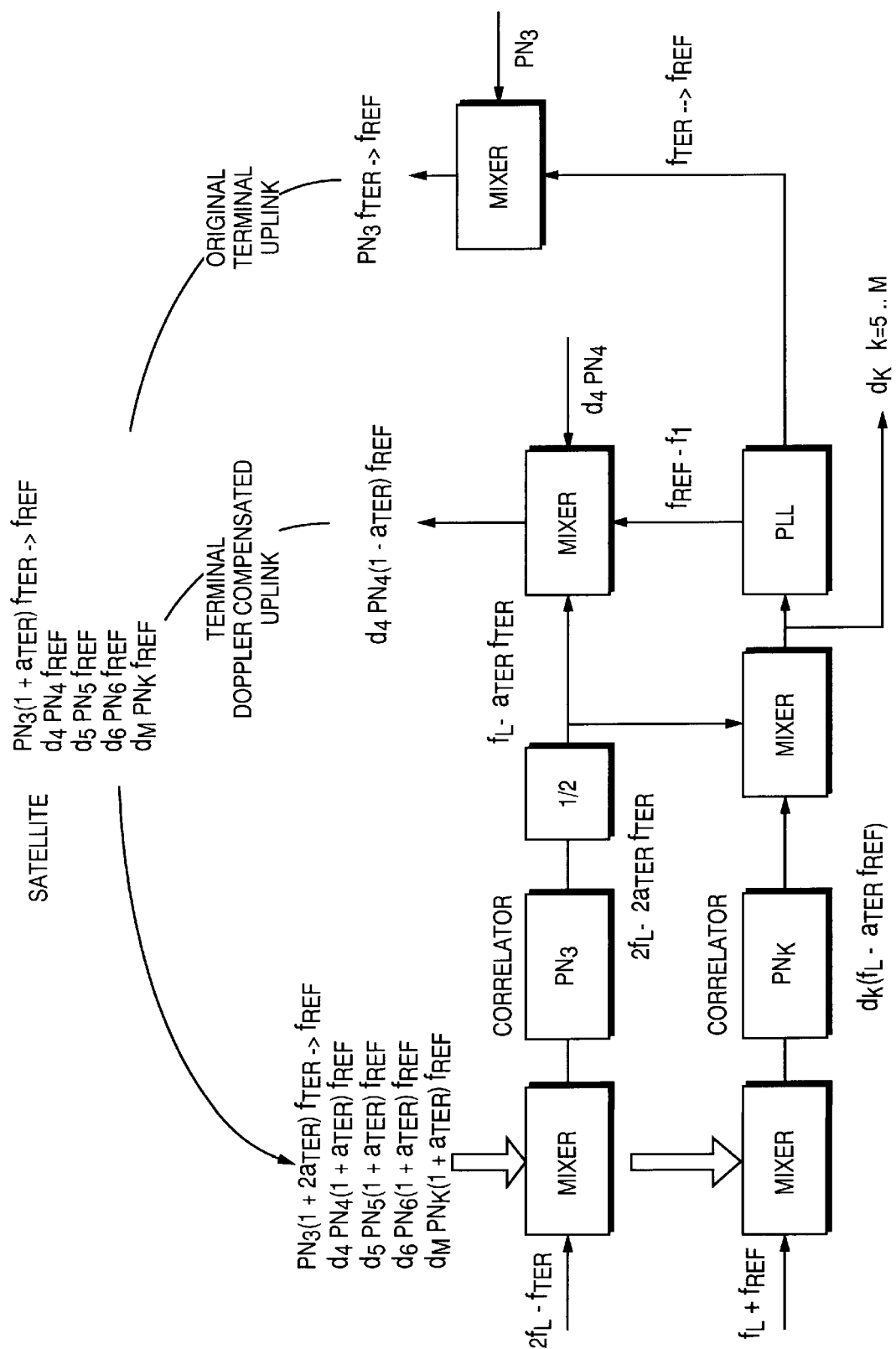

This $PN_2\, f_{REF}$ signal is used by the other terminals in the network as illustrated in FIG. 11 to frequency-lock a local terminal signal ($f_{TER}$) to the reference signal ($f_{REF}$). The measurement and compensation for the one-way Doppler effect ($a_{TER}$) is performed in the same way it is performed by the reference terminal by measuring the round trip Doppler effect (2 $a_{TER}$) using the uplink signal transmitted encoded with $PN_3$. The various data bearing signals transmitted from differing terminals, after being frequency synchronized to the $f_{REF}$ signal at the satellite (Doppler compensated and encoded with $PN_2$), and after being pre-compensated for the corresponding Doppler effects are available at the satellite as $d_i\, PN_i\, f_{REF}$, all signals frequency-locked to the reference frequency $f_{REF}$, each signal compensated by each terminal's one-way Doppler effect, as illustrated in FIG. 12. As shown, since the one-way Doppler factor ($a_{TER}$) is at any specific terminal, common to all downlink signals, the corresponding modulating information $d_i$, i=1,2, . . . M can then be received and decoded at any other terminal in the network.

In addition to satellite relay systems, the advantages of the present invention can also be applied to other situations such as cellular telephone networks and wholly terrestrial radio networks.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A method for providing data communications between terminals having different throughput capabilities, the throughput capabilities being expressible in multiples of a preselected minimum throughput rate, said method comprising:

establishing a frame interval comprising a plurality of time slot intervals, with each time slot interval comprising a predetermined plurality of symbol intervals, the number of symbol intervals being essentially equal to the number of symbols which can be transmitted or received during a time slot interval at said preselected minimum throughput rate;

establishing at least one pseudo noise (P/N) code, said code comprising a predetermined multiplicity of chips, said code being usable by cyclic rotation in each bit interval at a number of different phases corresponding to said predetermined multiplicity;

assigning a single respective phase to any terminal operating at said minimum throughput rate;

assigning a plurality of sequential consecutive phases to terminals having capabilities greater than said minimum throughput rate; and assigning, to each terminal of capability greater than said minimum throughput, a number of time slots in accordance with the amount of data traffic to be carried by that terminal and the number of code phases assigned to that terminal, any terminals operating at said preselected minimum throughput rate utilizing all time slots.

2. A method as set forth in claim 1 further comprising providing one or more unassigned phases between phases assigned to different terminals.

3. A method as set forth in claim 2 further comprising providing one or more unassigned chip intervals between the blocks of chips intervals corresponding to successive symbols.

4. A method as set forth in claim 3 wherein received blocks of chips are resynchronized by transferring chips occurring after a resynchronization cutoff point to the initial portion of the block interval.

5. A method as set forth in claim 1 wherein for each symbol interval, in each terminal which is transmitting, the baseband signal is a linear combination of the corresponding chip values of each of the code phases assigned to that terminal and the corresponding information values, binary or not, assigned respective code phases, such linear combination including the straight sum of above mentioned chip and information values.

6. A method as set forth in claim 1 wherein, in each terminal which is transmitting, the r.f. signal is modulated as a function of the baseband signal to be transmitted during each time slot interval, with no signal power transmitted during the symbol intervals prepended to the left of the modulated signal.

7. A method as set forth in claim 1 wherein, in each terminal which is transmitting, an r.f. signal is modulated as a function of the binary data to be transmitted during each time slot and the respective code phases assigned to that terminal.

8. A method as set forth in claim 2 wherein, in each terminal which is receiving, a rotating correlator is provided for decoding received r.f. signals modulated with said P/N codes at the phases assigned to that terminal.

9. A system for communicating data, via a relay satellite, between ground terminals having different throughput capabilities, the throughput capabilities being expressible in multiples of a preselected minimum throughput rate, said system comprising:

means for establishing, for the different terminals, a common frame interval comprising a plurality of time slot intervals with each time slot interval comprising a predetermined plurality of bit intervals, the number of bit intervals being essentially equal to the number of bits which can be transmitted or received during a time slot interval at said minimum throughput rate;

means within each terminal for storing a pseudo noise (P/N) code comprising a predetermined multiplicity of chips, said code being usable by cyclic rotation in each time slot interval at a number of different phases corresponding to said predetermining multiplicity;

means for assigning a respective phase to any channel including a terminal operating at said minimum throughput rate;

means for assigning a plurality of sequential consecutive phases to channels linking terminals of capabilities greater than said minimum throughput rate, the number of phases assigned corresponding to the terminal of lowest capability throughput capacity employing the channel, there being one or more unassigned phases between phases assigned to different channels;

means for assigning, to each terminal of capability greater than said minimum throughput, a number of time slots in accordance with the amount of data traffic to be carried by that terminal and the number of code phases assigned to that terminal, any terminals operating at said preselected minimum throughput rate utilizing all time slots.

10. A system as set forth in claim 9 wherein said means for establishing a common time frame interval includes means for measuring the r.f. transit time between each terminal and the relay satellite and means for adjusting the transmission timing of each terminal to effect essentially simultaneous arrival at the relay satellite of the frame interval transmission from different terminals.

* * * * *